March 10, 1931. A. C. HARDY 1,795,366
SPLASH SHIELD
Filed Aug. 13. 1929
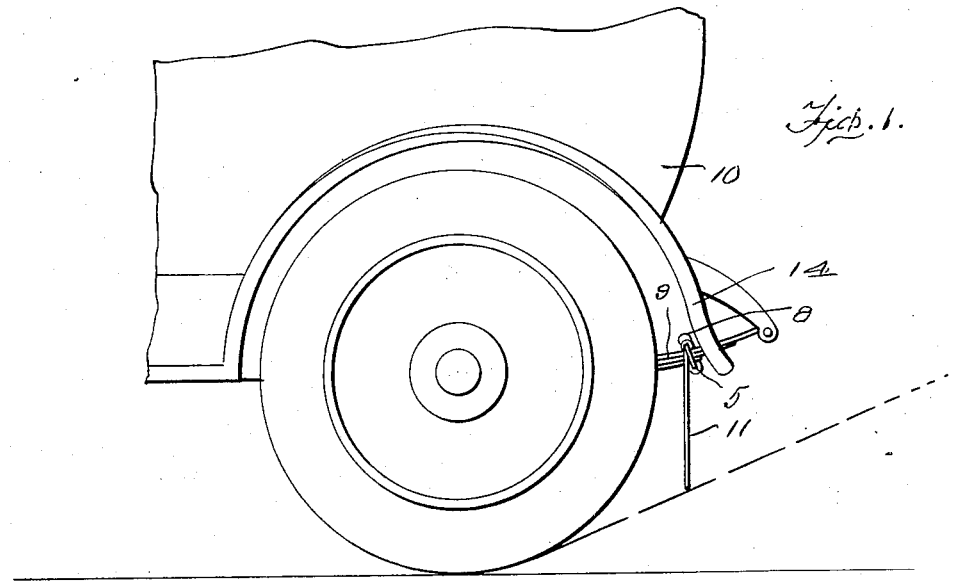
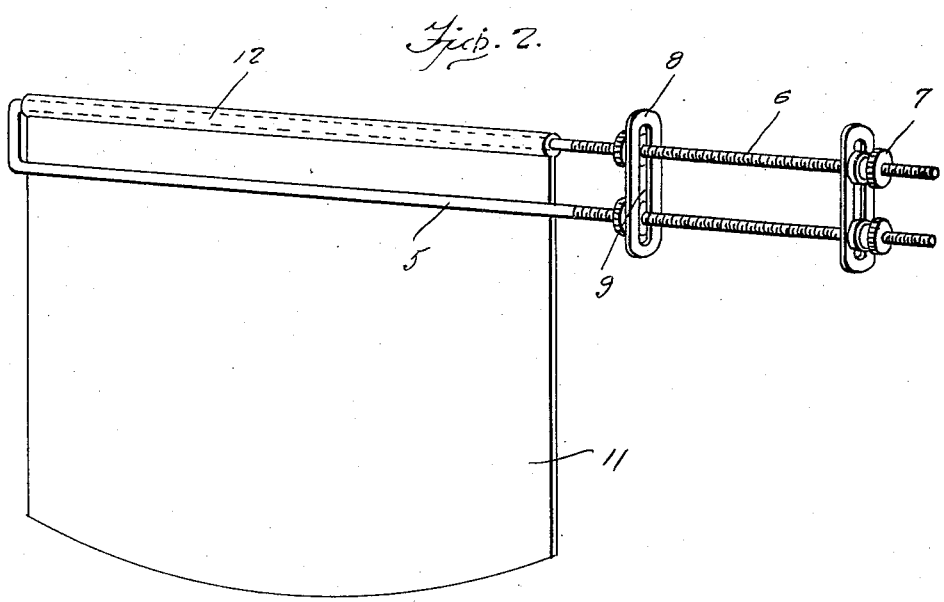
Inventor
Alfred C. Hardy
By Clarence A O'Brien
Attorney Patented Mar. 10, 1931

1,795,366

UNITED STATES PATENT OFFICE

ALFRED C. HARDY, OF KINGSTON, PENNSYLVANIA

SPLASH SHIELD

Application filed August 13, 1929. Serial No. 385,628.

The present invention relates to splash shields for automobiles and other vehicles and has for its principal object to provide a device of this character which is attachable to the vehicle adjacent the rear wheel thereof whereby to prevent mud and other substances picked up by the wheel during its rotation from being splashed against the lower edge of the rear mud guard or upon the rear bumper of the vehicle.

One of the important objects of the present invention is to provide adjustable attaching means for the splash shield whereby to enable the same to be secured to the spring of the vehicle in a desired position.

A further object is to provide an attachment of this character of a simple and practical construction, which is neat and attractive in appearance, inexpensive to manufacture, which may be easily and quickly installed in position upon the vehicle without necessitating any changes or alterations in the construction thereof and which is otherwise well adapted to the purposes for which the same is intended.

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

Figure 1 is a fragmentary side elevational view of an automobile showing the splash shield in position thereon, and Figure 2 is a perspective view of the splash shield.

Referring to the drawing in detail the invention comprises a U-shaped attaching bracket designated by the numeral 5 having its ends threaded as shown at 6 and upon each end of which a pair of nuts 7 are threadedly carried.

A pair of plates 8 are also carried at the threaded end of the brackets having slotted opening 9 therein through which the ends of the brackets are inserted, the plates being positioned at opposite sides of the spring 9 of the vehicle designated generally at 10. The provision of the slotted opening 9 in the plate enable the spreading apart of the ends of the attaching brackets in order that the same may be placed in position upon springs of various sizes.

A shield member 11 is also carried by the bracket and may be constructed of leather, sheet metal or other suitable material with one edge rolled as shown at 12 to provide a tube through which one end of the bracket may be inserted.

The bracket is supported in a horizontal position by the spring so that the shield will be suspended at the uppermost arm of the bracket and in advance of the lowermost arm thereof and interposed in spaced relation between the wheel 13 and the rear mud guard 14 of the vehicle, as clearly illustrated in Figure 1 of the drawings.

By supporting the shield in this manner, it will be apparent that the lower arm of the bracket will engage the shield so as to prevent the swinging of the shield rearwardly when mud or other substances picked up by the wheel of the vehicle is thrown against the shield. The shield will be normally prevented from striking the wheel by reason of the forward momentum of the vehicle.

The lower edge of the shield extends below the lower edge of the rear mud guard a substantial distance so as to protect the same from mud thrown rearwardly by the wheel.

It is obvious that my invention is susceptible of various changes and modifications in construction without departing from the spirit of the invention or the scope of the appended claims, and I accordingly claim all such forms of the device to which I am entitled.

Having thus described my invention, what I claim as new is:

1. A vehicle splash shield comprising a U-shaped attaching bracket having its ends threaded, a pair of plates carried at the threaded end of the bracket, nuts threaded on the bracket for securing the plate in clamping position to the vehicle and a splash shield suspended from one of the arms of the bracket.

2. A vehicle splash shield comprising a

U-shaped attaching bracket having its ends threaded, a pair of plates carried at the threaded end of the bracket, nuts threaded on the bracket for securing the plate in clamping position to the vechicle, and a splash shield suspended from one of the arms of the bracket and engaging the other arm of the bracket to prevent rearward swinging movement thereof.

3. A vehicle splash shield comprising a U-shaped attaching bracket having its ends threaded, a pair of plates carried at the threaded end of the bracket, nuts threaded on the bracket for securing the plate in clamping position to the vehicle, a splash shield having one edge secured to one of the arms of the bracket and suspended therefrom in advance of the other arm of the bracket whereby to support the shield against rearward swinging movement.

4. A splash shield for automobiles comprising a U-shaped attaching bracket having its ends threaded, a pair of clamping plates having slotted openings for mounting on the threaded ends of the brackets, nuts threaded on the ends of the brackets for securing the plates in clamping position upon the automobile whereby to support the bracket in a horizontal position rearwardly of one of the wheels thereof and a splash shield having its upper edge rolled for receiving one of the arms of the bracket for suspending the splash shield in advance of the other arm of the bracket whereby to secure the splash shield against rearward swinging movement.

ALFRED C. HARDY.